Patented June 15, 1926.

1,588,458

UNITED STATES PATENT OFFICE.

MAX ISLER AND LUCAS von MECHEL, OF BASEL, SWITZERLAND, ASSIGNORS TO SOCIETY OF CHEMICAL INDUSTRY IN BASLE, OF BASEL, SWITZERLAND.

AZODYESTUFFS CONTAINING CHROMIUM AND PROCESS OF MAKING SAME.

No Drawing. Original application filed December 9, 1924, Serial No. 754,841, and in Switzerland December 28, 1923. Divided and this application filed December 1, 1925. Serial No. 72,581.

The present application, which is a division of our application Serial No. 754,841, filed December 9th, 1924, relates to new azo dyestuffs containing chromium. It comprises the new dyestuffs, the process of making same, as well as the material dyed with the new dyestuffs.

It has been found that new azo dyestuffs containing chromium may be obtained by treating the dyestuffs corresponding with the general formula:

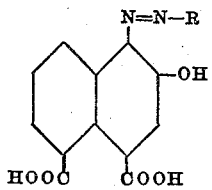

wherein R stands for any aromatic residue, which dyestuffs are obtainable as described in the application Serial No. 754,841, filed December 9th, 1924, by coupling diazo compounds with 3-hydroxynaphthalene-1.8-dicarboxylic acid, with agents yielding metals, such as compounds of copper and especially of chromium. These new dyestuffs are derivatives of the azo dyestuffs corresponding to the general formula mentioned above. They form blackish powders, dissolving in water and in caustic soda solution with violet and blue coloration, and yielding, when printed on cotton with chromium mordants, from Bordeaux red to violet, grey and black tints which are fast, and which dyestuffs, when treated with reducing agents, split into an aromatic amino compound and the 4-amino-3-hydroxynaphthalene-1:8-dicarboxylic acid.

The following examples illustrate the invention without limiting it, the parts being by weight:—

Example 1.

A paste of hydrated chromium oxide containing 40 parts of water and corresponding with 8.5 parts of $Cr_2O_3$, 24 parts of potassium hydroxide, and 9 parts of glycerin are heated together until a complete solution is formed. The latter is diluted to 150 parts, then mixed with 22 parts of the dyestuff from diazotized 4-chloro-2-amino-1-phenol and 3-hydroxynaphthalene-1:8-dicarboxylic acid corresponding most probably with the formula:

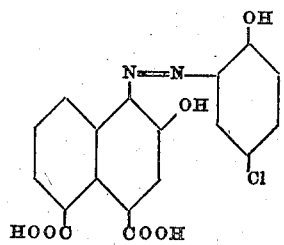

and the whole boiled in a reflux apparatus until no further change of color in the solution is observable. Water is now added, the whole brought to neutrality by addition of a mineral acid and the dyestuff salted out, filtered and dried. It forms a blackish powder soluble in water to a red-violet solution which is not changed by addition of caustic soda solution; in concentrated sulphuric acid the solution appears green in thin layers and deep red in thicker layers. The new dyestuff dyes wool blue in an acid bath; when printed on cotton it yields violet tints of remarkable fastness.

The azo dyestuffs from the following o-hydroxydiazo compounds yield chromium compounds which, when printed on cotton, produce violet tints: 1-amino-1-phenol-4-sulfonic acid, 4-methyl-2-amino-1-phenol-6-sulfonic acid, 4-chloro-2-amino-1-phenol-6-sulfonic acid.

Example 2.

52.7 parts of the dyestuff obtainable by coupling the nitrated diazo compound of the 1-amino-2-hydroxynaphthalene-4-sulfonic acid with the 3-hydroxynaphthalene-1:8-dicarboxylic acid corresponding most probably with the formula:

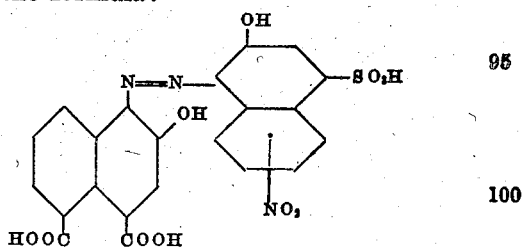

are dissolved in 1000 parts of hot water. The solution is mixed with an aqueous solution of chromium formate corresponding with 22.8 parts of $Cr_2O_3$ and is boiled in a reflux apparatus until no further change of color in the solution is observable. The chromium dyestuff thus formed is salted out, filtered and dried. It is a blackish powder, soluble in water, to a black-blue solution which passes to dark-violet on addition of caustic soda solution; in concentrated sulphric acid it dissolves to a blue-green solution.

In an acid bath it dyes wool dark green tints; on cotton it prints fast grey tints.

The azo dyestuff containing chromium obtained from diazotized 2-amino-1-phenol-4-sulfo-6-carboxylic acid, when printed on cotton, yields Bordeaux tints; the dyestuff containing chromium from diazotized 4:6-dinitro-2-amino-1-phenol reddish-grey tints and the dyestuff containing chromium from diazotized 5-nitro-2-amino-1-phenol blackish tints.

What we claim is:—

1. As a new process the herein described manufacture of new azo dyestuffs containing chromium which are derivatives of the dyestuffs corresponding to the general formula:

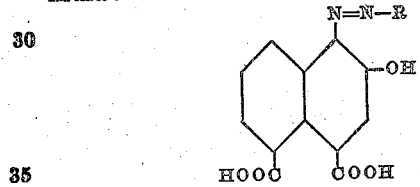

wherein R stands for any aromatic residue, consisting in treating the dyestuffs obtainable by coupling 3-hydroxynaphthalene-1:8-dicarboxylic acid with a diazo-compound, with agents adapted to yield chromium.

2. As a new process the herein described manufacture of new azo dyestuffs containing chromium which are derivatives of the dyestuffs corresponding to the general formula:

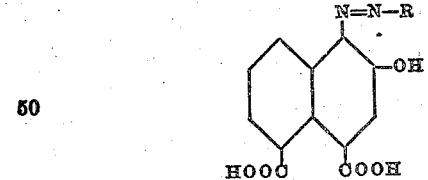

wherein R stands for any aromatic residue having a hydroxyl group in ortho-position to the azobridge, consisting in treating the dyestuffs obtainable by coupling 3-hydroxy-naphthalene-1:8-dicarboxylic acid with a diazotized aromatic ortho-hydroxy amino compound, with agents adapted to yield chromium.

3. As a new process the herein described manufacture of new azo dyestuffs containing chromium which are derivatives of the dyestuffs corresponding to the general formula:

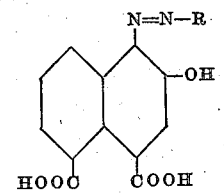

wherein R stands for any aromatic residue of the benzene series having a hydroxyl group in ortho-position to the azobridge, consisting in treating the dyestuffs obtainable by coupling 3-hydroxynaphthalene-1:8-dicarboxylic acid with a diazotized ortho-amino-phenol compound, with agents adapted to yield chromium.

4. As new products the herein described new azo dyestuffs containing chromium, which are derivatives of the dyestuffs corresponding to the general formula:

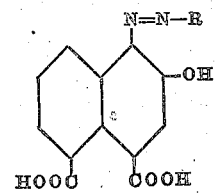

wherein R stands for any aromatic residue, which dyestuffs form blackish powders, dissolving in water and in caustic soda solution to violet and blue solutions, yielding, when printed on cotton with chromium mordants, fast Bordeaux to violet, grey and black tints, and which dyestuffs are capable of being split into an aromatic amino compound and 4-amino-3-hydroxynaphthalene-1:8-dicarboxylic acid on treatment with reducing agents.

5. As new products the herein described new azo dyestuffs containing chromium, which are derivatives of the dyestuffs corresponding to the general formula:

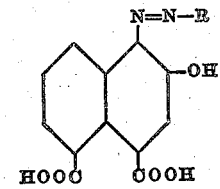

wherein R stands for any aromatic residue having a hydroxyl group in ortho-position to the azobridge, which dyestuffs form blackish powders, dissolving in water and in caustic soda solution to violet and blue solutions, yielding, when printed on cotton with chromium mordants, fast Bordeaux to violet and grey tints, and which dyestuffs are capable of being split into an aromatic ortho-hydroxyamino compound and 4-amino- 3-hydroxynaphthalene-1:8-dicarboxylic acid on treatment with reducing agents.

6. As new products the herein described new azo dyestuffs containing chromium, which are derivatives of the dyestuffs corresponding to the general formula:

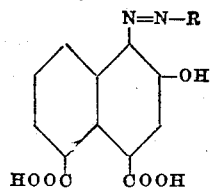

wherein R stands for any aromatic residue of the benzene series having a hydroxyl group in ortho-position to the azobridge, which dyestuffs form blackish powders, dissolving in water and in caustic soda solution to violet and blue solutions, yielding, when printed on cotton with chromium mordants, fast Bordeaux to violet and grey tints, and which dyestuffs are capable of being split into an ortho-aminophenol compound and 4-amino-3-hydroxynaphthalene-1:8-dicarboxylic acid on treatment with reducing agents.

7. The material dyed with the new dyestuffs of claim 4.

8. The material dyed with the new dyestuffs of claim 5.

9. The material dyed with the new dyestuffs of claim 6.

In witness whereof we have hereunto signed our names this 21st day of November, 1925.

MAX ISLER.
LUCAS von MECHEL.